Figures 1, 2:
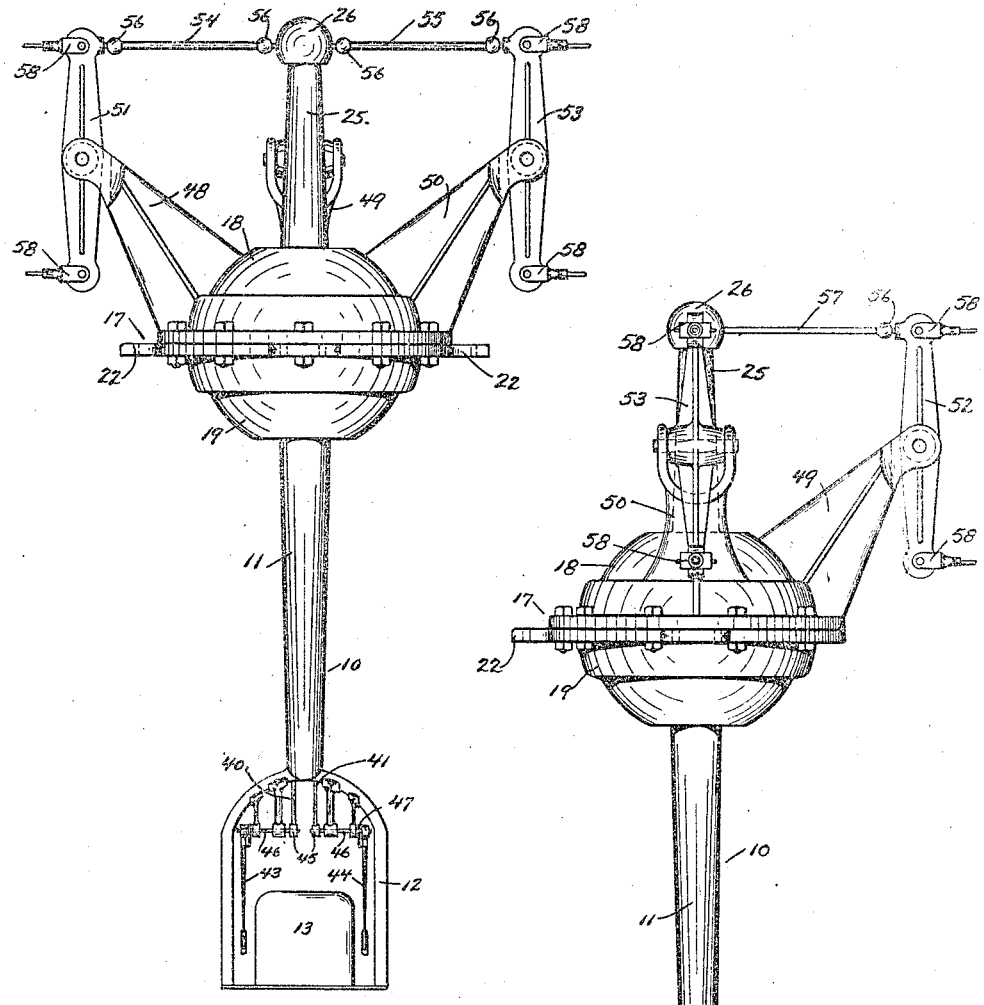

G. C. JOHNSON.
STABILIZER.
APPLICATION FILED APR. 15, 1915.

1,173,977.

Patented Feb. 29, 1916.
4 SHEETS—SHEET 1.

G. C. JOHNSON.
STABILIZER.
APPLICATION FILED APR. 15, 1915.

1,173,977.

Patented Feb. 29, 1916.
4 SHEETS—SHEET 2.

WITNESSES.
Lawrence N. Geoger
Walter H. Kelley

INVENTOR
Grover C. Johnson
BY J. W. Ellis
ATTORNEY

G. C. JOHNSON.
STABILIZER.
APPLICATION FILED APR. 15, 1915.

1,173,977.

Patented Feb. 29, 1916
4 SHEETS—SHEET 4.

WITNESSES.
Lawrence N. Yenger
Walter H. Kelley

INVENTOR.
Grover C. Johnson
BY
ATTORNEY

UNITED STATES PATENT OFFICE.

GROVER C. JOHNSON, OF BUFFALO, NEW YORK.

STABILIZER.

1,173,977.

Specification of Letters Patent.

Patented Feb. 29, 1916.

Application filed April 15, 1915. Serial No. 21,510.

*To all whom it may concern:*

Be it known that I, GROVER C. JOHNSON, a citizen of the United States of America, residing in the city of Buffalo, county of Erie, and State of New York, have invented certain new and useful Improvements in Stabilizers, of which the following is a full, clear, and exact description.

My invention relates generally to stabilizing or balancing devices for use on air ships of the aeroplane and dirigible-balloon type.

The principal object of my invention has been to provide a device, which, while operating on the pendulum principle, shall not materially increase the weight of the machine.

To accomplish this end, my device comprises a pendulum at the lower end of which is provided a seat for the operator, who forms a weight for the pendulum.

Another object has been to provide a device which shall stabilize the aeroplane and cause it to move on an even keel, irrespective of variations in air pressure, winds and other conditions. My device may also be adjusted so as to cause the craft to travel in any predetermined direction without affecting the operation of the stabilizer. When so adjusted, the stabilizer will operate to keep the craft traveling in any predetermined direction.

Another object has been to provide a device in which the operating mechanism shall be incased and protected from damage.

I have sought to accomplish the above objects and advantages, as well as others apparent to those skilled in the art, by the device shown in the accompanying drawings.

Figure 3:
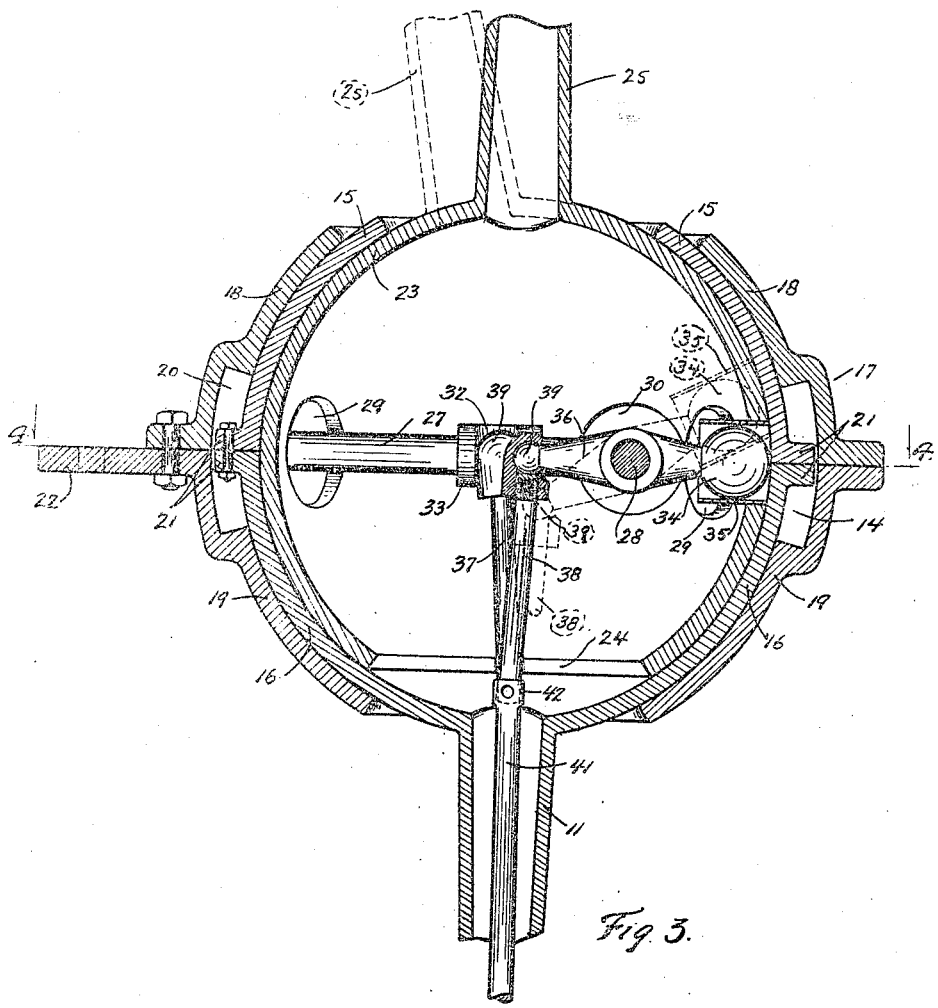
Figure 4:
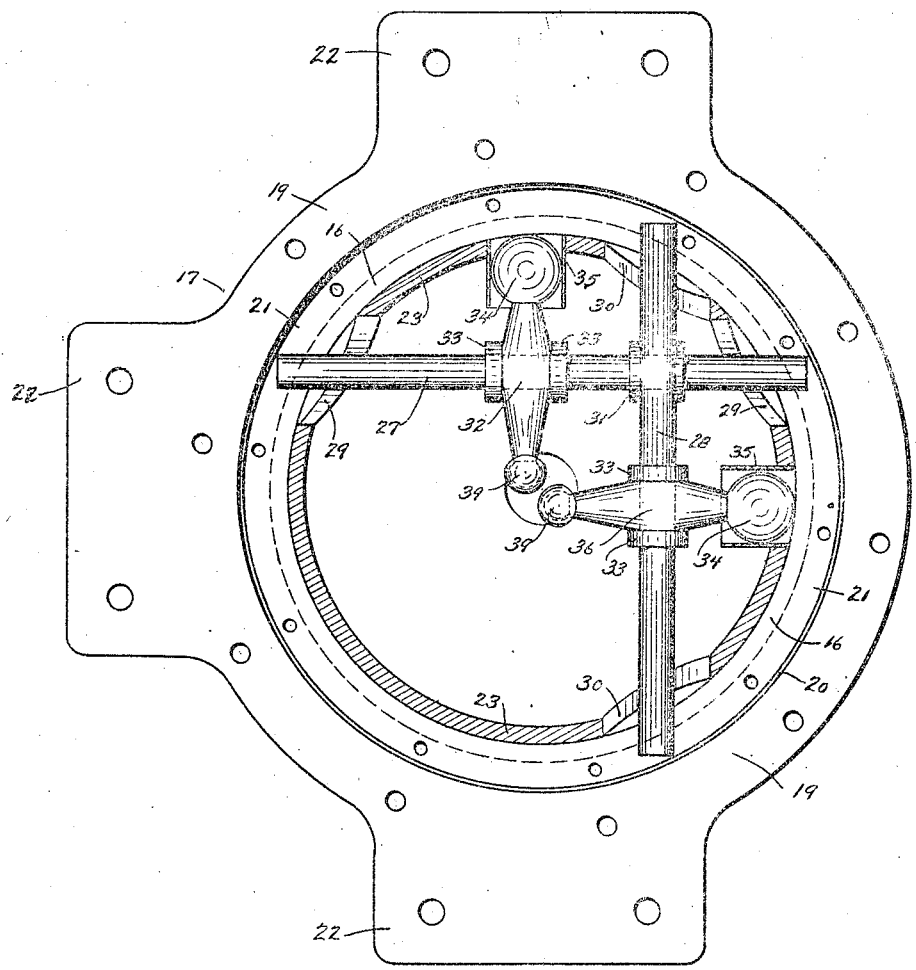
Figure 5:
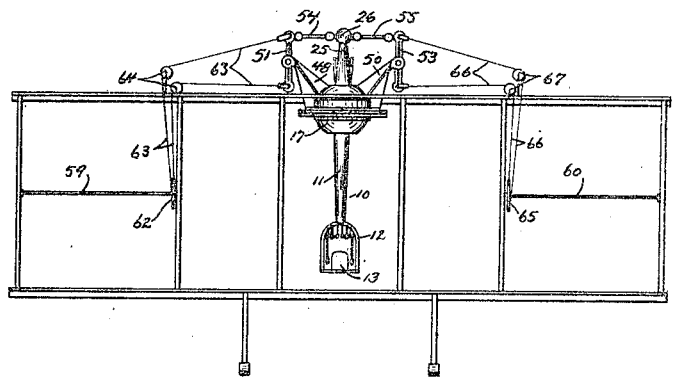
Figure 6:
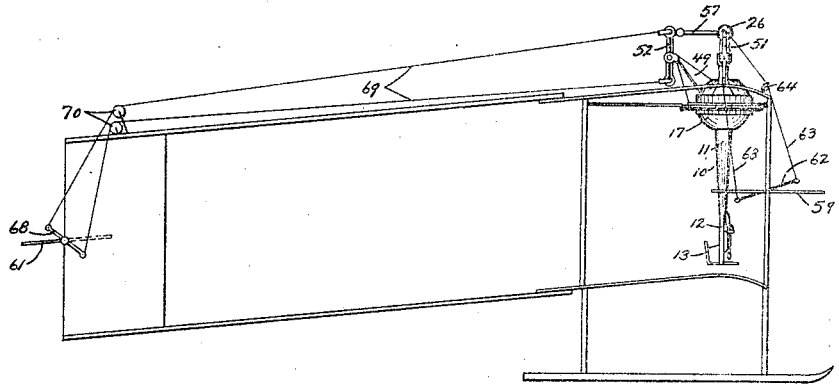

In the drawings, like characters of reference indicate like parts throughout the several views, of which:

Figure 1 is an exterior, front elevation of the complete device. Fig. 2 is a side elevation of the same. Fig. 3 is an enlarged, vertical, sectional view of the spherical portion of my device. Fig. 4 is a sectional, plan view of the same, taken on line 4—4 of Fig. 3. Fig. 5 shows a front elevation of an aeroplane provided with my device. Fig. 6 shows a side elevation of the same.

For convenience, I have shown and described my invention as applied to a typical form of aeroplane.

Referring now more particularly to Figs. 1 to 4, 10 represents the pendulum of my device, which has a hollow stem 11, and at its lower end a forked member 12. At the lower end of the forked member is carried a seat 13 for the operator of the craft. This forked member also carries a controlling mechanism, hereinafter described. At the upper end of the pendulum stem 11 is provided an outer, hollow sphere 14, which is formed preferably in two parts 15 and 16, the part 16 being preferably integral with the upper end of the pendulum stem 11. This sphere is so mounted within a suitable casing 17 that the pendulum will have a swinging motion in all directions. This casing is split and composed of two halves 18 and 19. The casing parts 18 and 19 are formed with a recess 20, within which the flanges 21 of the outer, hollow sphere are arranged to move. The lower half 19 of the casing 17 is provided with flanges 22, whereby it may be secured to the aeroplane. Mounted within the outer, hollow sphere 14 is an inner, hollow sphere 23, which is arranged to move independently of the outer sphere 14. This sphere is provided with a large aperture 24 at its lower side and with a vertical rising stem 25 at its upper side. At the upper end of the stem 25 is provided a ball and socket joint 26 which connects with the plane controlling means, hereinafter described.

The inner, hollow sphere 23 is adjustably connected with the outer, hollow sphere 14 by means which I will now describe: Two shafts 27 and 28 are arranged to pass through enlarged apertures 29 and 30, respectively, formed in the inner, hollow sphere 23, and have their ends clamped between the joints of the two halves 15 and 16 of the outer, hollow sphere 14. These shafts are arranged on the horizontal, center line of the outer, hollow sphere and at right angles to each other. Where the shafts are made separate, the shaft 28 is provided with an enlarged portion 31, through which the shaft 27 is arranged to pass. These shafts are arranged at one side of the center of the sphere and substantially midway between the center of the sphere and the exterior periphery of the inner, hollow sphere 23. Rotatably carried by each of the shafts 27 and 28 are levers 32 and 36, respectively, and on each side of each lever is arranged a collar 33, which prevents axial movement of the levers along the shafts. The outer end of each of these levers is provided with a ball 34, which is disposed within a tube 35 secured to and arranged through the wall of the inner, hollow sphere 23. Each of the levers 32 and 36 is connected with each of the operating links 37 and 38, respectively, by means of ball and socket joints 39. The links 37 and 38 are connected, preferably by means of hinged joints 42, with the operating rods 40 and 41, respectively. These operating rods pass down through the central opening in the tubular stem 11 of the pendulum and are connected at their lower ends with the operating levers 43 and 44, respectively, by means of the levers 45 and shafts 46. These shafts are rotatably carried in suitable bearings supported from the forked member 12. Each of the operating levers 43 and 44 is provided with a suitable segment 47, whereby the lever may be moved and set in a predetermined position. The upper half 18 of the casing 17 is provided with three arms 48, 49 and 50, as clearly seen in Figs. 1, 2, 5 and 6. Each of these arms is arranged with a bifurcated, outer end, and pivotally carried by each are rocker arms 51, 52 and 53, respectively. Connecting the ball and socket joint 26 with the upper ends of the rocker arms 51 and 53 are rods 54 and 55, respectively. These rods are united at each end to the parts with which they connect by means of ball and socket joints 56. The ball and socket joint 26 is connected with the rocker arm 52 by means of a rod 57, which rod has one end rigidly secured to the said joint and the other end secured to the upper end of the rocker arm 52 by means of the ball and socket joint 56. The connection of these parts by means of the ball and socket joints, gives perfect, free and universal action between the members of the device. The connecting rod 57, being rigidly connected to the joint 26, keeps the said joint normally in its position. At each end of the rocker arms 51, 52 and 53 are arranged rope clevises 58, whereby these rocker arms are connected with the cables controlling the planes of an aeroplane.

Referring now to Figs. 5 and 6, 59 and 60 are the side balancing planes, and 61, the rear balancing plane of an aeroplane. My device is mounted at the front of the craft and at such an elevation so as to bring the seat 13 in the usual position. The casing 17 is secured to the aeroplane frame work in such a position that the arms 48 and 50 will extend toward the left and right, respectively, of the craft, and the arm 49 to the rear of the same. The rocker arm 51 carried by the arm 48 is connected with the arm 62 secured to the plane 59 by means of ropes or cables 63, which pass over suitable idlers 64. In a like manner, the rocker arm 53, carried by the arm 50, is connected with the arm 65 of the balancing plane 60 by means of the cables 66, which pass over idlers 67. The arm 68 of the rear balancing plane 61 is connected with the rocker arm 52, carried by the arm 49, by means of the rods or cables 69, which extend to the rear of the craft and pass over idlers 70.

The operation of my device is as follows: When the craft, equipped with my stabilizer, is traveling along through the air on an even keel and anything occurs to cause the craft to tip in any direction, the operator in the seat 13 forms the weight for the pendulum and this pendulum will keep in a vertical position. As the stem 25, in its normal position, is on the same axis as the hollow stem 11 of the pendulum, this stem will move when the pendulum moves and in an opposite direction thereto. This stem being connected by means of the rods 54, 55 and 57 with the plane-controlling means, the planes will be regulated so as to right the craft and cause it to continue on an even keel. When the operator desires to change the course of the craft, for instance to cause it to descend, the operating lever 44 is temporarily released from engagement with its segment 47 and is moved away from the operator any desired distance, whereupon being released it will be locked in said position by engagement with the segment. When this lever is moved forward it will cause the operating rod 41, link 38 and the inner end of the lever 36 to be drawn downwardly. As the inner end of the lever 36 is moved downwardly, the sphere 34 at the outer end thereof will be moved upwardly and will carry with it the inclosing sleeve 35, (see dotted lines Fig. 3) thus causing the inner sphere 23 to be rotated within the outer, hollow sphere 14 and change the relative positions of the pendulum stem 11 and the stem 25 of the inner sphere. When the stem 25 is tipped backwardly, as just described, it will cause the rocker arm 52 to be tilted and will thus change the normal position of the rear, balancing plate 61 so that it will guide the craft in a downward direction. When it is desired to cause the craft to turn, the operating lever 43 is operated in either direction, depending upon the determined course, and the motion of the lever 43 will act upon the lever 32 within the inner sphere 23 in a like manner to that just described in connection with the lever 36 and cause the rocker arms 51 and 53 to be tilted so as to move the balancing planes 59 and 60 in a position to direct the craft in the desired course. When either of the levers 32 or 36 are adjusted, the operation of the stabilizer is in no wise affected, but will operate to stabilize the craft in whatever course the operator may desire. It will be seen that the pendulum is free to swing from its spherical joint within the casings 17, idependent of the operating means.

While I have shown and described my device with ordinary, turned bearings between the spherical parts, it is obvious that anti-friction bearings, of any suitable style, may be employed, if desired. This and other modifications of the details herein shown and described may be made without departing from the spirit of my invention or the scope of the appended claims, and I do not wish to be limited to the exact embodiment herein shown and described.

Having thus described my invention, what I claim is:

1. A stabilizer for air ships comprising, a pendulum, an operator's seat secured to the lower end of said pendulum, a stem controllable by said pendulum and extending upwardly above it, means connected with said stem for controlling the side and rear guiding means of the air ship, and means controlled by the operator for moving said stem in any desired position, whereby the path of travel of the air ship may be governed.

2. A stabilizer for air ships comprising a universal joint, a pendulum secured at its upper end to said joint, an operator's seat secured to the lower end of said pendulum, a stem controllable by said pendulum and extending upwardly above it, means connected with said stem for controlling the side and rear guiding means of the air ship, and means controlled by the operator for moving said stem in any desired position, whereby the path of travel of the air ship may be governed.

3. A stabilizer for air ships comprising, a spherical casing secured to the air ship frame, a hollow sphere movably disposed within said casing, a pendulum secured to and depending from said sphere, an operator's seat secured to the lower end of said pendulum, a stem controllable by said pendulum and extending upwardly above it, means connected with said stem for controlling the side and rear guiding means of the air ship, and means controlled by the operator for moving said stem in any desired direction, whereby the path of the air ship may be governed.

4. A stabilizer for air ships comprising, a spherical casing secured to the air ship frame, an outer hollow sphere movably disposed within said casing, a pendulum secured to and depending from said sphere, an operator's seat secured to the lower end of said pendulum, an inner, hollow sphere movably mounted within said outer sphere, a stem secured to and rising from said inner sphere, and means connected with said stem for controlling the side and rear guiding means of the air ship.

5. A stabilizer for air ships comprising, a spherical casing secured to the air ship frame, a hollow sphere movably disposed within said casing, a pendulum secured to and depending from said sphere, an operator's seat secured to the lower end of said pendulum, a stem controllable by said pendulum and extending upwardly above it, rocker arms pivotally carried by said casing, means connecting said rocker arms with said stem, and means connecting said rocker arms with the guiding means of the air ship.

6. A stabilizer for air ships comprising, a spherical casing secured to the air ship frame, an outer, hollow sphere movably disposed within said casing, a pendulum secured to and depending from said sphere, an inner, hollow sphere movably mounted within said outer sphere, a stem secured to and rising from said inner sphere, means controllable by the operator for changing the relative positions of said spheres, and means connected with said stem for controlling the side and rear guiding means of the air ship.

7. A stabilizer for air ships comprising, a spherical casing secured to the air ship frame, an outer, hollow sphere movably disposed within said casing, a pendulum secured to and depending from said sphere, an inner, hollow sphere movably mounted within said outer sphere, a stem secured to and rising from said inner sphere, means controllable by the operator for changing the relative positions of said spheres comprising, operating rods, shafts arranged at right angles to each other, within said inner sphere and rigidly secured to said outer sphere, a lever rotatably carried by each of said shafts, each lever having one of its ends connected to the inner sphere and its other end connected by a universal joint to one of each of said operating rods, and means connected with said stem for controlling the side and rear guiding means of the air ship.

8. A stabilizer for air ships comprising, a spherical casing secured to the air ship frame, an outer, hollow sphere movably disposed within said casing, a pendulum secured to and depending from said sphere, an inner, hollow sphere movably mounted within said outer sphere, a stem secured to and rising from said inner sphere, means controllable by the operator for changing the relative positions of said spheres, operating rods, operating levers, means for setting said levers in any desired position, shafts arranged at right angles to each other, within said inner sphere and rigidly secured to said outer sphere, a lever rotatably carried by each of said shafts, each lever having one of its ends connected to the inner sphere and its other end connected by a universal joint to one of each of said operating rods, and means connected with said stem for controlling the side and rear guiding means of the air ship.

9. A stabilizer for air ships comprising, a spherical casing secured to the air ship frame, an outer, hollow sphere movably disposed within said casing, a pendulum secured to and depending from said sphere, an inner, hollow sphere movably mounted within said outer sphere, a stem secured to and rising from said inner sphere, means controllable by the operator for changing the relative positions of said spheres, operating rods, means for controlling said operating rods, shafts arranged at right angles to each other, within said inner sphere and rigidly secured to said outer sphere, a lever rotatably carried by each of said shafts, a ball at the outer end of each of said levers, tubes secured to the wall of said inner sphere for engaging the balls of said levers, the inner ends of said levers being connected with said operating rods by universal joints, and means connected with said stem for controlling the side and rear guiding means of said air ship.

In testimony whereof, I have hereunto signed my name in the presence of two subscribing witnesses.

GROVER C. JOHNSON.

Witnesses:
J. WM. ELLIS,
WALTER H. KELLEY.